United States Patent
Chatterji et al.

(10) Patent No.: US 6,762,155 B2
(45) Date of Patent: Jul. 13, 2004

(54) METHODS OF REMOVING WATER-BASED DRILLING FLUIDS AND COMPOSITIONS

(75) Inventors: Jiten Chatterji, Duncan, OK (US); Sears T. Dealy, Comanche, OK (US); Ronald J. Crook, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 0 days.

(21) Appl. No.: 10/377,538

(22) Filed: Feb. 28, 2003

(65) Prior Publication Data

US 2004/0033907 A1 Feb. 19, 2004

Related U.S. Application Data

(62) Division of application No. 10/219,642, filed on Aug. 15, 2002, now Pat. No. 6,554,069.

(51) Int. Cl.$^7$ ................................................ C09K 3/00
(52) U.S. Cl. ..................... 507/207; 507/244; 507/247; 507/927; 507/928
(58) Field of Search ................................ 507/207, 244, 507/247, 927, 928; 166/291, 312, 300

(56) References Cited

U.S. PATENT DOCUMENTS

| | | | |
|---|---|---|---|
| 3,244,638 A | 4/1966 | Foley et al. | 252/308 |
| 3,799,874 A | 3/1974 | Parker | 252/8.55 R |
| 3,850,248 A | 11/1974 | Carney | 166/291 |
| 4,108,779 A | 8/1978 | Carney | 252/8.5 P |
| 4,233,162 A | 11/1980 | Carney | 252/8.5 C |
| 4,588,032 A | 5/1986 | Weigand et al. | 166/291 |
| 5,458,195 A | 10/1995 | Totten et al. | 166/293 |
| 6,063,737 A | 5/2000 | Haberman et al. | 507/261 |
| 6,227,294 B1 | 5/2001 | Chatterji et al. | 166/293 |

Primary Examiner—Philip C. Tucker
(74) Attorney, Agent, or Firm—Craig W. Roddy; C. Clark Dougherty, Jr.

(57) ABSTRACT

The present invention provides methods and compositions for removing a water-based drilling fluid from surfaces in a well bore and leaving the surfaces water-wet. A method of the invention basically comprises the following steps. A water-based drilling fluid removal solution comprised of water and a mixture of a sulfonated kraft lignin salt and an N-methyl-N-oleyltaurine salt dissolved therein is provided. The drilling fluid is displaced from the well bore and the well bore surfaces are contacted with the removal solution to thereby remove the drilling fluid from the surfaces and make the surfaces water-wet.

17 Claims, No Drawings

METHODS OF REMOVING WATER-BASED DRILLING FLUIDS AND COMPOSITIONS

CROSS-REFERENCE TO RELATED APPLICATION

This application is a Divisional of application Ser. No. 10/219,642 filed on Aug. 15, 2002, now U.S. Pat. No. 6,554,069.

BACKGROUND OF THE INVENTION

1. Field of the Invention

This invention relates to removing drilling fluid from well bores with aqueous removal solutions, and more particularly, to aqueous removal solution spacers utilized between drilling fluids and hydraulic cement compositions which remove drilling fluid from well bore surfaces and prevent cement composition contamination.

2. Description of the Prior Art

A variety of drilling fluids have been used heretofore in drilling subterranean well bores utilizing the rotary drilling method. The most commonly used such drilling fluids are water-based gels formed with clays and/or polymers. When a well bore is drilled using the rotary method, the drilling fluid is circulated downwardly through the drill string, through the drill bit and upwardly in the annulus between the walls of the well bore and the drill string. The drilling fluid functions to maintain hydrostatic pressure on formations penetrated by the well bore and thereby prevent blow-outs and, to remove cuttings from the well bore. As the drilling fluid is circulated, a filter cake of solids from the drilling fluid forms on the walls of the well bore. The filter cake build-up is a result of initial fluid loss into permeable formations and zones penetrated by the well bore. The filter cake and gelled or partially gelled drilling fluid mixed therewith reduce or prevent additional fluid loss as the well is drilled.

After the well bore reaches its total depth, the drilling and circulation of drilling fluid are stopped and a string of pipe, i.e., casing, is run into the well bore. After the pipe is run, the well bore is conditioned by circulating drilling fluid downwardly through the interior of the string of pipe and upwardly through the annulus between the pipe and the walls of the well bore. The purpose of the conditioning is to remove as much of the filter cake and gelled or partially gelled drilling fluid from the walls of the well bore as possible. However, at the end of the conditioning, drilling fluid remains on the surfaces of the well bore and on the string of pipe therein.

Primary cementing operations are next performed in the well bore, i.e., the string of pipe disposed in the well bore is cemented therein by placing a hydraulic cement composition in the annulus and allowing it to set into a hard impermeable mass. The hydraulic cement composition is placed in the annulus by pumping the cement composition through the interior of the string of pipe and in the opposite direction into the annulus. The hydraulic cement composition displaces the drilling fluid from the string of pipe and the annulus whereby the annulus is filled with the hydraulic cement composition which is allowed to set therein.

A problem which is encountered in the above described cementing procedure is that because drilling fluid remains on the surfaces of the well bore and on the surfaces of the string of pipe in the annulus, a strong bond between the hydraulic cement composition after setting and the surfaces in the well bore does not result. This, in turn, allows pressurized formation fluids to enter and migrate through the well bore as well as other undesirable consequences.

In order to solve the above described problem, aqueous spacer fluids containing surfactants and other chemicals have been included between the drilling fluid and hydraulic cement compositions. As the drilling fluid is displaced, the aqueous spacer fluid contacts the drilling fluid remaining on the well bore and pipe string surfaces to remove the drilling fluid therefrom. While such spacer fluids have been used successfully to remove a major portion of the drilling fluid from the surfaces, all of the drilling fluid has often not been removed and the surfaces have not been left water-wet. As a result, the strength of the bond between the surfaces and the set hydraulic cement composition in the annulus is often not as strong as it needs to be to prevent the entry of pressurized formation fluids into the well bore and the deterioration of the cement bond.

Thus, there is a need for improved water-based drilling fluid removal solutions for use in well bores which provide enhanced removal of drilling fluid therein and leave the surfaces in the well bores water-wet whereby a very strong bond between the surfaces and the hydraulic cement compositions placed therein is achieved.

SUMMARY OF THE INVENTION

By the present invention improved methods of removing water-based drilling fluids from surfaces in a well bore and leaving the surfaces water-wet are provided which meet the needs described above and overcome the deficiencies of the prior art. A method of the invention is basically comprised of the following steps. A water-based drilling fluid removal solution comprised of water and a mixture of a sulfonated kraft lignin salt and an N-methyl-N-oleyltaurine salt dissolved therein is provided. The water-based drilling fluid is displaced from the well bore and the well bore surfaces are contacted with the removable solution to thereby remove the drilling fluid from the surfaces and make the surfaces water-wet.

Another method of removing a water-based drilling fluid from a well bore having a pipe string disposed therein, making the surfaces of the pipe string and the well bore water-wet and placing a hydraulic cement composition in the annulus between the pipe string and the walls of the well bore is provided by the present invention. Upon setting, the hydraulic cement composition readily bonds to the surfaces of the pipe string and the well bore and seals the annulus. This method basically comprises the following steps. A water-based drilling fluid removing spacer is provided comprised of a water solution having a mixture of a sulfonated kraft lignin salt and an N-methyl-N-oleyltaurine salt dissolved therein. The spacer followed by a hydraulic cement composition is pumped through the pipe string and through the annulus between the pipe string and the walls of the well bore so that the cement composition is placed in the annulus. Simultaneously, the drilling fluid and the spacer are displaced through and removed from the annulus. As a result, drilling fluid is removed from the well bore and pipe string surfaces forming the annulus and the surfaces are made water-wet to the hydraulic cement composition. The hydraulic cement composition in the annulus is then allowed to set.

The objects, features and advantages of the present invention will be readily apparent to those skilled in the art upon a reading of the description of preferred embodiments which follows.

DESCRIPTION OF PREFERRED EMBODIMENTS

As mentioned above, the present invention provides methods of removing a water-based drilling fluid from surfaces in a well bore and leaving the surfaces water-wet. The methods are basically comprised of providing a water-based drilling fluid removal solution comprised of water and a mixture of a sulfonated kraft lignin salt and an N-methyl-N-oleyltaurine salt dissolved therein. The drilling fluid is displaced from the well bore and the well bore surfaces are contacted with the removal solution to thereby remove the drilling fluid from the surfaces and make the surfaces water-wet.

The mixture of the sulfonated kraft lignin salt and the N-methyl-N-oleyltaurine salt dissolved in the removal solution is preferably comprised of 2 parts by weight of sulfonated kraft lignin salt and 1 part by weight of N-methyl-N-oleyltaurine salt. The mixture of sulfonated kraft lignin salt and N-methyl-N-oleyltaurine salt is generally present in the solution in an amount in the range of from about 1% to about 5% by weight of the solution, more preferably in an amount of from about 1% to about 3% and most preferably 2.4%. While various salts of the sulfonated kraft lignin and N-methyl-N-oleyltaurine can be utilized, sodium salts are preferred.

Another method of this invention for removing a water-based drilling fluid from a well bore having a pipe string disposed therein, making the surfaces of the pipe string and the well bore water-wet and placing a hydraulic cement composition in the annulus between the pipe string and the walls of the well bore is provided. Upon setting, the hydraulic cement composition readily bonds to the water-wet surfaces of the pipe string and the well bore and seals the annulus. This method is comprised of the following steps. A water-based drilling fluid removing spacer is provided comprised of a water solution having a mixture of a sulfonated kraft lignin salt and an N-methyl-N-oleyltaurine salt dissolved therein. The spacer is pumped followed by a hydraulic cement composition through the pipe string and through the annulus between the pipe string and the walls of the well bore so that the cement composition is placed in the annulus, the drilling fluid and spacer are displaced through and removed from the annulus, drilling fluid is removed from the well bore and pipe string surfaces forming the annulus and the surfaces are made water-wet to the hydraulic cement composition. Thereafter, the hydraulic cement composition is allowed to set.

The mixture of sulfonated kraft lignin salt and N-methyl-N-oleyltaurine salt is the same as described above and the mixture is present in the water solution in the amounts set forth above. As mentioned, the salts are preferably sodium salts.

The hydraulic cement composition is basically comprised of a hydraulic cement and sufficient water to form a pumpable slurry. A variety of hydraulic cements can be utilized in the well cement compositions of this invention including those comprised of calcium, aluminum, silicon, oxygen and/or sulfur which set and harden by reaction with water. Such hydraulic cements include, but are not limited to, Portland cements, pozzolana cements, gypsum cements, slag cements and high aluminum content cements. Portland cements are generally preferred for use in accordance with the present invention. Portland cements of the types defined and described in the *API Specification For Materials And Testing For Well Cements*, API Specification 10, 5$^{th}$ Edition, dated Jul. 1, 1990 of the American Petroleum Institute are particularly suitable. Preferred API Portland cements include classes A, B, C, G and H with API classes G and H generally being preferred.

The water utilized in the cement compositions can be fresh water or salt water. The term "salt water" is used herein to mean unsaturated aqueous salt solutions or saturated aqueous salt solutions including brine and seawater. The water utilized is generally present in the cement compositions useful in accordance with this invention in an amount in the range of from about 33% to about 120% by weight of hydraulic cement therein, more preferably in an amount in the range of from about 36% to about 65%.

As is well understood by those skilled in the art, the cement compositions can include a variety of conventional additives for improving or changing the properties of the compositions. Examples of such additives include, but are not limited to, set retarding agents, fluid loss control agents, dispersing agents and set accelerating agents.

The water-based drilling fluid removal solutions of this invention are basically comprised of water and a mixture of sulfonated kraft lignin salt and N-methyl-N-oleyltaurine salt dissolved therein. The water utilized in the drilling fluid removable solution can be fresh water or unsaturated salt water. As indicated above, the mixture of sulfonated kraft lignin salt and N-methyl-N-oleyltaurine salt is preferably comprised of 2 parts by weight of sulfonated kraft lignin salt and 1 part by weight of N-methyl-N-oleyltaurine salt. The mixture of the salts is present in the drilling fluid removal solution in the amounts set forth above and the salts in the mixture are preferably sodium salts.

A preferred method of removing a water-based drilling fluid from surfaces in a well bore and leaving the surfaces water-wet is comprised of the steps of: (a) providing a water-based drilling fluid removal solution comprised of water and a mixture of a sulfonated kraft lignin salt and an N-methyl-N-oleyltaurine salt dissolved therein; and (b) displacing the drilling fluid from the well bore and contacting the well bore surfaces with the removal solution to thereby remove the drilling fluid from the surfaces and make the surfaces water-wet.

Another preferred method of removing a water-based drilling fluid from a well bore having a pipe string disposed therein, making the surfaces of the pipe string and the well bore water-wet and placing a hydraulic cement composition in the annulus between the pipe string and the walls of the well bore whereby upon setting the hydraulic cement composition readily bonds to the surfaces of the pipe string and well bore and seals the annulus, comprises the steps of: (a) providing a water-based drilling fluid removing spacer comprised of a water solution having a mixture of a sulfonated kraft lignin salt and an N-methyl-N-oleyltaurine salt dissolved therein; (b) pumping the spacer followed by a hydraulic cement composition through the pipe string and through the annulus between the pipe string and the walls of the well bore so that the cement composition is placed in the annulus, the drilling fluid and spacer are displaced through and removed from the annulus, drilling fluid is removed from the well bore and pipe string surfaces forming the annulus and the surfaces are made water-wet to the hydraulic cement composition; and (c) allowing the hydraulic cement composition to set. A preferred water-based drilling fluid removal solution of this invention is comprised of water and a mixture of a sulfonated kraft lignin salt and an N-methyl-N-oleyltaurine salt dissolved therein. The salts are preferably sodium salts.

The methods and removal solutions of this invention are further illustrated by the following examples.

EXAMPLE I

The sodium salt of sulfonated kraft lignin prepared by the sulfonation and sulfoalkylation of alkali lignin obtained as a co-product of the kraft pulping process and the sodium salt of N-methyl-N-oleyltaurine were dissolved in water and blended in amounts (based on the solid chemicals) of 2 parts by weight sulfonated kraft lignin salt and 1 part by weight N-methyl-N-oleyltaurine. The resulting surfactant solution was spray dried and the resulting powder had a moisture content of about 8%, a pH of 10 and was free flowing. Thus, the surfactant powder can be shipped to the location of its use and dissolved in water just prior to use.

EXAMPLE II

The following experiment was performed to determine the ability of the mixture of sulfonated kraft lignin salt and N-methyl-N-oleyltaurine salt dissolved in water to remove water-based drilling fluid.

A cylinder of 1.9 inches in length and 1.6 inches in diameter formed of a 60 mesh screen was attached over the sleeve of a Fann Model 35 rotational viscometer having the Bob removed therefrom. The sleeve and the cylindrical screen were weighed to obtain their initial weight, $W_1$. The cylindrical screen attached to the sleeve was immersed into the viscometer cup containing either 10 pounds per gallon of water-based drilling fluid formed of calcium and magnesium silicate or 10 pounds per gallon of Pac/Dextrid water-based drilling fluid. The cylindrical screen attached to the sleeve was left in the drilling fluid under static conditions for 10 minutes at room temperature. The sleeve and cylindrical screen were removed from the viscometer cup and a smooth, homogenous layer of drilling fluid was deposited on the cylindrical screen. The sleeve and screen were left for 2 minutes so that any excess drilling fluid dripped off. Thereafter, the bottom surface was gently wiped off using a paper towel. The sleeve, the screen and the drilling fluid thereon were weighed, $W_2$. The weight of the drilling fluid deposited ($W_3$) was $W_3=W_2-W_1$. The cylindrical screen attached to the sleeve and coated with the drilling fluid was dipped into the viscometer cup containing the water-based drilling fluid removal solution of this invention having a concentration of sulfonated kraft lignin salt and N-methyl-N-oleyltaurine salt of 2.4% by weight of the solution. The sleeve and the cylindrical screen attached thereto were rotated at 100 rpm for 5 minutes and then taken out of the drilling fluid removal solution. Excess solution was allowed to drip for 2 minutes and the bottom was wiped off gently with a paper towel. The sleeve and screen were weighed, $W_4$. The amount of water-based drilling fluid removed by the removal solution in 5 minutes was $W_3-W_4$. The process was repeated at the end of each 5 minutes until 20 minutes elapsed.

The water-based drilling fluid removal solution of this invention was replaced by a prior art water-based drilling fluid removal solution comprised of the sodium salt of acid pyrophosphate and a mixture of alkyl and aryl sulfonates. This water-based drilling fluid removal solution is commercially available from Halliburton Energy Services, Inc. of Duncan, Okla. under the trade designation "MUD FLUSH™". This prior art drilling fluid removal solution is utilized for removing water-based drilling fluids from all types of formations. It lowers the viscosity of drilling fluids and helps maintain solids in the dispersed state. It also functions to break emulsions and water blocks.

The above described experiment was repeated utilizing the "MUD FLUSH™" drilling fluid removal solution. A comparison of the drilling fluid removal properties of the removal solution of this invention and the prior art "MUD FLUSH™" are set forth in Table II below.

The compositions of the 10 pounds per gallon mixed metal silicate water-based fluid and the 10 pounds per gallon Pac/Dextrid water-based drilling fluid are set Table I below.

TABLE I

Water-Based Drilling Fluids

| Components In Water | Metal Silicate Drilling Fluid, lb/bbl | Pac/Dextrid Drilling Fluid, lb/bbl |
| --- | --- | --- |
| Bentonite Clay | 10.0 | 6.0 |
| Starch | 4.0[1] | 5.0 |
| Barium Sulfate | 90.0 | 90.0 |
| Mixed Metal Silicates | 0.75 | — |
| Sodium Hydroxide | 0.75 | 0.8 |
| Carboxymethyl Cellulose | — | 2.0 |
| Xanthan Gum | — | 0.5 |

[1]carboxymethyl starch

TABLE II

Comparison Of Present Invention And Prior Art Removal Solutions

| Sleeve Rotation Time, min. | Prior Art Removal Solution[1], Drilling Fluid Removed | | Present Invention Removal Solution[2], Drilling Fluid Removed | |
| --- | --- | --- | --- | --- |
| | Metal Silicate Drilling Fluid | Pac/Dextrid Drilling Fluid | Metal Silicate Drilling Fluid | Pac/Dextrid Drilling Fluid |
| 5 | 26.8% | 0 | 43.0% | 37.4% |
| 10 | 31.9% | 22.5% | 46.1% | 63.6% |
| 15 | 31.9% | 35.2% | 50.7% | 74.8% |
| 20 | — | — | 56.6% | 77.2% |

[1]"MUD FLUSH ™"
[2]Water solution of sulfonated kraft lignin sodium salt and N-methyl-N-oleyltaurine sodium salt From Table II above it can be seen that the water-based drilling fluid removal solution of this invention removes a significantly greater amount of drilling fluid than the prior art water-based drilling fluid removal solution.

EXAMPLE III

The water-wetting capability of the water-based drilling fluid removal solution of this invention and the above described "MUD FLUSH™" removal solution were determined by the following experiment. 250 milliliters of an oil-water emulsion was placed in each of two 500 milliliter glass jars. The glass jars were then vigorously agitated to coat the jars with the emulsion. The emulsion was discarded from the 2 jars leaving an oil film inside both jars. The jars were then thoroughly rinsed with fresh water and the rinse water was discarded from the jars. To one jar, 75 milliliters of the water-based drilling fluid of the present invention was added and to the other jar 75 milliliters of the prior art "MUD FLUSH™" removal solution was added. The jars were then vigorously agitated for 15 seconds and the removal solutions were discarded therefrom. A visual inspection of the jars showed that the jar rinsed with "MUD FLUSH™" was left with oil streaks while the jar rinsed with the removal solution of the present invention was totally absent of oil thereby showing that the removal solution of the present invention is very efficient in water-wetting surfaces.

Thus, the present invention is well adapted to carry out the objects and attain the ends and advantages mentioned as well as those which are inherent therein. While numerous changes can be made by those skilled in the art, such changes are encompassed within the spirit of this invention as defined by the appended claims.

What is claimed is:

1. A water-based drilling fluid removal solution consisting essentially of water and a mixture of a sulfonated kraft lignin salt and an N-methyl-N-oleyltaurine salt dissolved therein.

2. The drilling fluid removal solution of claim 1 wherein said water is selected from the group consisting of fresh water and salt water.

3. The drilling fluid removal solution of claim 1 wherein said mixture of said sulfonated kraft lignin salt and said N-methyl-N-oleyltaurine salt comprises 2 parts by weight of sulfonated kraft lignin salt and 1 part by weight of N-methyl-N-oleyltaurine salt.

4. The drilling fluid removal solution of claim 1 wherein said mixture of sulfonated kraft lignin salt and N-methyl-N-oleyltaurine salt is present in said solution in an amount in the range of from about 1% to about 5% by weight of said solution.

5. The drilling fluid removal solution of claim 1 wherein said mixture of sulfonated kraft lignin salt and N-methyl-N-oleyltaurine salt is present in said solution in an amount in the range of from about 1% to about 3% by weight of said solution.

6. The drilling fluid removal solution of claim 1 wherein said mixture of sulfonated kraft lignin salt and N-methyl-N-oleyltaurine salt is present in said solution in an amount of about 2.4% by weight of said solution.

7. The drilling fluid removal solution of claim 1 wherein said sulfonated kraft lignin salt and said N-methyl-N-oleyltaurine salt are sodium salts.

8. A water-based drilling fluid removal solution consisting essentially of water selected from the group consisting of fresh water and salt water; and a mixture of a sulfonated kraft lignin salt and an N-methyl-N-oleyltaurine salt dissolved therein, wherein said mixture comprises 2 parts by weight of sulfonated kraft lignin salt and 1 part by weight of N-methyl-N-oleyltaurine salt.

9. The drilling fluid removal solution of claim 8 wherein said mixture of sulfonated kraft lignin salt and N-methyl-N-oleyltaurine salt is present in said solution in an amount in the range of from about 1% to about 5% by weight of said solution.

10. The drilling fluid removal solution of claim 8 wherein said mixture of sulfonated kraft lignin salt and N-methyl-N-oleyltaurine salt is present in said solution in an amount in the range of from about 1% to about 3% by weight of said solution.

11. The drilling fluid removal solution of claim 8 wherein said mixture of sulfonated kraft lignin salt and N-methyl-N-oleyltaurine salt is present in said solution in an amount of about 2.4% by weight of said solution.

12. The drilling fluid removal solution of claim 8 wherein said sulfonated kraft lignin salt and said N-methyl-N-oleyltaurine salt are sodium salts.

13. A water-based drilling fluid removal solution consisting essentially of water and a mixture of a sulfonated kraft lignin salt and an N-methyl-N-oleyltaurine salt dissolved therein wherein said mixture comprises 2 parts by weight of sulfonated kraft lignin salt and 1 part by weight of N-methyl-N-oleyltaurine salt and is present in said solution in an amount in the range of from about 1% to about 5% by weight of said solution.

14. The drilling fluid removal solution of claim 13 wherein said solution comprises water selected from the group consisting of fresh water and salt water.

15. The drilling fluid removal solution of claim 13 wherein said mixture of sulfonated kraft lignin salt and N-methyl-N-oleyltaurine salt is present in said solution in an amount in the range of from about 1% to about 3% by weight of said solution.

16. The drilling fluid removal solution of claim 13 wherein said mixture of sulfonated kraft lignin salt and N-methyl-N-oleyltaurine salt is present in said solution in an amount of about 2.4% by weight of said solution.

17. The drilling fluid removal solution of claim 13 wherein said sulfonated kraft lignin salt and said N-methyl-N-oleyltaurine salt are sodium salts.

* * * * *